UNITED STATES PATENT OFFICE.

ROBERT GRAY, GEORGE OSBORN, HERBERT BIRTWHISTLE STOCKS, AND HENRY GRAHAM WHITE, OF HOOTON, ENGLAND, ASSIGNORS TO THE GUM TRAGASOL SUPPLY CO. LD., OF HOOTON, ENGLAND.

OBTAINING GUM-TRAGASOL FROM LOCUST-BEANS.

No. 800,369. Specification of Letters Patent. Patented Sept. 26, 1905.

Application filed December 28, 1903. Serial No. 186,878.

*To all whom it may concern:*

Be it known that we, ROBERT GRAY, GEORGE OSBORN, HERBERT BIRTWHISTLE STOCKS, and HENRY GRAHAM WHITE, subjects of the King of Great Britain, and residents of Hooton, in the county of Chester, England, all of The Gum Tragasol Supply Co. Ld., (whose post-office address is Hooton, Chester county, aforesaid,) have invented certain new and useful Improvements in Obtaining Gum-Tragasol from Locust-Beans, (for which application has been made in England on the 11th of December, 1903, No. 27,186,) of which the following is a specification.

In the manufacture of gum-tragasol, which is obtained from the kernels or beans found in the pods of the locust or carob tree, (*Ceratonia siliqua*,) great difficulty has been experienced through the husks of the locust-kernels being of an extremely-tight-sticking nature and being impregnated with a soluble coloring-matter which dissolves in the gum and gives it a dark unsightly color. Hitherto these husks have been removed by a long and very expensive process of milling, and in these milling operations a considerable amount of gum is lost.

Now our invention consists in a partly mechanical and partly chemical treatment, whereby this expensive system of milling is in great part avoided; and it consists in softening and expanding the husk with water to such an extent that it is comparatively loose upon the cotyledon, separating the loosened husks and germs from the cotyledon by a mechanical process, and then if there be still some husk or dye remaining on the cotyledons making the residual dye insoluble by precipitating it as a lake.

In carrying out our invention the whole kernels of the locust-bean are boiled for about half an hour in water, so as to equalize the softness of the shells, as those shells are in nature of very varying degrees of hardness. They are now drained of the water, which contains a considerable percentage of the ojectionable coloring-matter of the husk. They are then steeped for four or five hours in cold water, which is then run off, and the kernels are placed in a washing-machine called a "whizzer," which removes all moisture from the outside of the husks. The kernels are now put through one or more brush decorticating-machines, which separate the husks from the cotyledons. Then the cotyledons, which contain the gum, are placed in mashing-vats immediately, and the gum is extracted in the usual way. After decorticating the cotyledons from the husk and germs should it appear necessary to further clear the gum from any remaining coloring-matter which might be present either from the husk or germ we add a small quantity of alum, a solution of sulfate of alumina, or other mordant which will form a lake with any coloring-matter left in the cotyledons, and then proceed to extract the gum in the usual way.

We declare that what we claim is—

1. The process of treating locust-beans which consists in softening the husk to such a degree that it is comparatively loose on the cotyledons, separating the husk and germ mechanically from the cotyledons, and extracting the gum from the cotyledons.

2. The process of treating locust-beans, which consists in softening the husk to such a degree that it is comparatively loose on the cotyledons, separating the husk and germ mechanically from the cotyledons, and making any residual dye insoluble by fixing it chemically as a lake.

3. The process of treating locust-beans, which consists in boiling the beans in water till the husks are of pretty uniform softness, keeping the husks in contact with water until they have become comparatively loose on the cotyledons, then separating them and the germs mechanically from the cotyledons, and finally extracting the gum from the latter.

4. The process of treating locust-beans which consists in boiling the beans for about half an hour, leaving them to steep for four or five hours further in cold water until the husks are sufficiently softened and separating the husks and germs from the cotyledons mechanically, washing and fixing any residual coloring-matter as a lake, substantially as described.

5. The improvement in the process of treating locust-beans for obtaining gum-tragasol, which consists in softening the husks by means of water, separating the cotyledons from the husks and germs mechanically, and then extracting the gum from the cotyledons.

6. The improvement in the process of treating locust-beans for obtaining gum-tragasol, which consists in boiling the beans for half an hour until sufficiently soft, separating the surplus water and then leaving them wet until the husks are sufficiently soft to be decorticated in an ordinary brush decorticating-machine, then decorticating them, and finally separating the gum from the cotyledons.

7. The improvement in the process of treating locust-beans for obtaining gum-tragasol, which consists in thoroughly permeating the husks with moisture until sufficiently soft to easily leave the cotyledons, then separating them by mechanical action, and finally extracting the gum from the cotyledons.

8. The improvement in the process of treating locust-beans for obtaining gum-tragasol, which consists in softening the husks, separating them by mechanical action, washing the cotyledons and rendering the residual matter insoluble by a precipitant.

9. The improvement in the process of treating locust-beans for obtaining gum-tragasol, which consists in separating the husks and germs from the cotyledons, washing the cotyledons and rendering the residual matter insoluble by a precipitant.

10. The improvement in the process of treating locust-beans for obtaining gum-tragasol, which consists in separating the husk and germ from the cotyledons, treating the cleaned cotyledons with a soluble salt of alumina and then immediately extracting the gum in the usual manner.

In witness whereof we have hereunto signed our names, this 18th day of December, 1903, in the presence of two subscribing witnesses.

ROBERT GRAY.
GEORGE OSBORN.
HERBERT BIRTWHISTLE STOCKS.
HENRY GRAHAM WHITE.

Witnesses:
 WM. P. THOMPSON,
 SIDNEY W. DOD.